Feb. 25, 1930.  C. C. C. BURKHARDT ET AL  1,748,829
INTERNAL COMBUSTION LOCOMOTIVE
Filed July 7, 1928
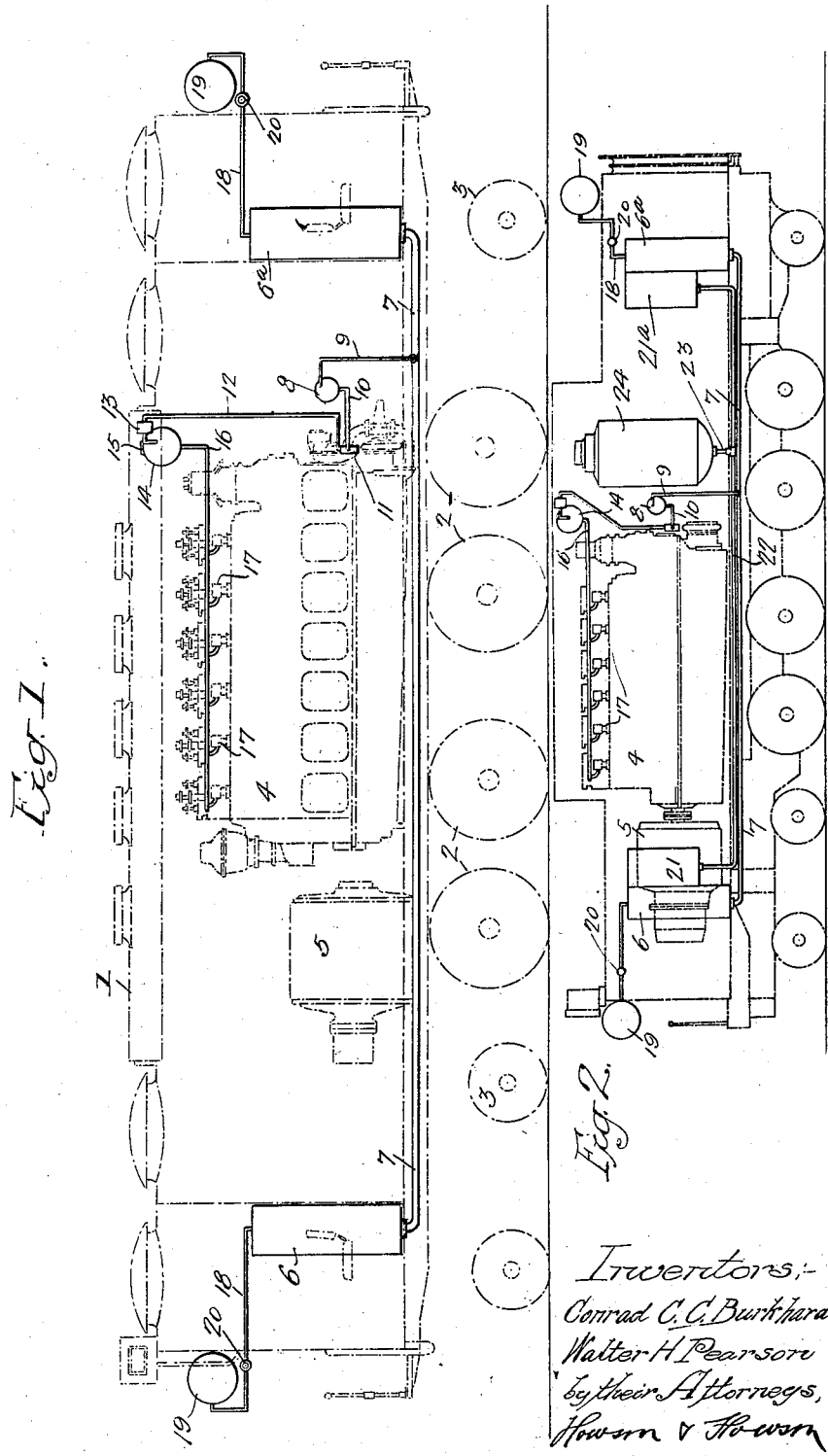

Patented Feb. 25, 1930

1,748,829

UNITED STATES PATENT OFFICE

CONRAD C. C. BURKHARDT, OF PHILADELPHIA, AND WALTER H. PEARSON, OF MANOA, PENNSYLVANIA

INTERNAL-COMBUSTION LOCOMOTIVE

Application filed July 7, 1928. Serial No. 291,084.

This invention relates to the location of fuel oil tanks on internal combustion locomotives; and to the location of the heating water tanks of locomotives used in passenger service.

The object of our invention is to so arrange the fuel oil tanks and the heating water tanks that the weight upon the driving wheels will be uniform and constant on all drivers. This object we attain by locating a fuel oil tank at each side of the centre of the locomotive, and by providing means whereby the fuel in the tanks will be equalized as it is used; and when it is necessary to supply water to heaters in locomotives of this type used in passenger service, then the tanks for the heating water are located on each side of the centre of the locomotive and are also arranged so that the water in the tanks will be equalized as it is used.

In the accompanying drawing:

Fig. 1 is a diagrammatic view illustrating an internal combustion locomotive of the "Diesel" freight type, showing the tanks and pipes in full lines; and Fig. 2 is a diagrammatic view of an internal combustion locomotive of the passenger type, showing the location of the fuel oil tanks, and also the location of the heating water tanks for supplying the heating boiler with water.

In the accompanying drawings, 1 is the body of a locomotive of the internal combustion type. 2 are the driving-wheels. 3 are the truck wheels. 4 is an internal combustion engine of the "Diesel" type. 5 is a direct current electric generator, which is driven by the engine 4. Both the engine and the generator are mounted in the cab of the locomotive, the voltage generated being conveyed through a suitable control equipment to the direct current series motors mounted on individual driving axles of any number necessary, according to the weight of the locomotive. The truck axles may also have electric motors mounted thereon if desired, or they may be used simply to carry weight and not produce a tractive effort.

It is known that the weight on each driver should remain constant, if possible, or uniform on all drivers if not constant. This is required to allow the motors to function to the best advantage. If the weight of one driver varies with that of another in the same wheel arrangement, the motors being the same, one motor will work to better advantage than the other.

Previous to our invention, the location of the fuel oil tanks was not considered, and, consequently, as the fuel oil was used, the weight on drivers and trucks varied to such a degree that tons of weight had been removed from the drivers and placed on motorless axles to the disadvantage of traction, but by our invention this objection has been overcome.

Referring to the drawings, 6—6ª are two oil fuel tanks, one located, in the present instance, at each end of the locomotive. These tanks are connected by an equalizing pipe 7, which in turn is connected to a priming tank 8 by a pipe 9, and this priming tank is connected to a pipe 10 with a pump 11 preferably of the geared type. The pump in turn is connected by a pipe 12 with a filter 13, the oil passing through the filter into a current supply tank 14 having a vent 15. 16 is a pipe leading to the several individual injection pumps 17 from each cylinder of the "Diesel" engine.

The fuel in the tanks 6—6ª is under pressure. The upper end of each tank is connected by a pipe 18 with an air reservoir 19 which, in the present instance, is an air-brake reservoir of the locomotive. In the pipe 18 is a pressure-reducing valve 20. It will, therefore, be seen that, as the fuel oil in the tanks is used, the weight becomes less in each tank, but the weight on the drivers will not be shifted from one to the other. However, any less weight due to consumption of fuel and water will be evenly distributed so as not to affect the operation of the electric motors on the several driving axles.

The locomotive shown in Fig. 1 is intended for freight service and a water-heating outfit is not necessary in this type of locomotive, but in a locomotive of the passenger type, such as is illustrated in Fig. 2, the water tanks 21—21ª are located at each side of the centre of the locomotive and are connected by an equalizing pipe 22, with a feed pipe 23 leading to a heating boiler 24, and while the weight becomes less as the water in each tank is used, the weight on the drivers will not be shifted, but will be evenly distributed so as not to affect the operation of the motors.

We claim:—

1. The combination in a locomotive in which liquid is carried in tanks for consumption, of two tanks placed one near each end of the locomotive; and an equalizing pipe connecting the two tanks, so that as the liquid is consumed the weight will be evenly distributed in order not to affect the tractive weight of the driving-wheels of the locomotive on the tracks.

2. The combination in an internal combustion locomotive, of a cab; driving wheels supporting the cab; electric motors; a generator, said generator being driven by the engine, the voltage being conveyed to the motors; two fuel oil tanks, one at each end of the locomotive; an equalizing pipe connecting the two tanks; means for supplying fuel to the engine from the equalized tanks; a boiler; and a water tank at each end of the locomotive, and an equalizing pipe connecting the two tanks with the boiler so that as the weight due to the consumption of fuel and water becomes less, it will not affect the even distribution of the weight on the driving wheels of the locomotive.

3. The combination in a locomotive using an internal combustion engine, of two fuel oil tanks, one near each end of the locomotive; an equalizing pipe connecting the two tanks; and means for conveying the fuel oil from the tanks to the cylinders of the engine, so that as the weight of the fuel in the tanks becomes less due to the consumption of the fuel, the weight will be distributed so as not to affect the operation of the electric motors by which the locomotive is driven.

4. The combination in an internal combustion locomotive, of a cab; an internal combustion engine located in the cab of the locomotive; an electric generator driven by the engine; driving wheels and individual motors on the driving-wheels; two fuel oil tanks, one at each end of the locomotive; an equalizing pipe connecting the two tanks; and a pipe leading from the equalizing pipe to a pump which forces the oil to a current supply tank and from the current supply tank to the several cylinders of the engine, so that as the fuel oil is used the weight becomes less due to the consumption of the fuel but the weight will not be shifted, it being evenly distributed so as not to affect the operation of the electric motors.

CONRAD C. C. BURKHARDT.
WALTER H. PEARSON.